(12) United States Patent
Ge et al.

(10) Patent No.: US 8,981,720 B2
(45) Date of Patent: Mar. 17, 2015

(54) CHARGING DOCK FOR PORTABLE ELECTRONIC DEVICE

(75) Inventors: Hai-Qian Ge, Shenzhen (CN); Tai-Shan Zhu, Shenzhen (CN); Zhou Chen, Shenzhen (CN); Che-Yu Chou, New Taipei (TW)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 272 days.

(21) Appl. No.: 13/527,876

(22) Filed: Jun. 20, 2012

(65) Prior Publication Data

US 2013/0257376 A1 Oct. 3, 2013

(30) Foreign Application Priority Data

Mar. 29, 2012 (CN) .......................... 2012 1 0087447

(51) Int. Cl.
*H02J 7/00* (2006.01)

(52) U.S. Cl.
USPC ........... 320/114; 320/107; 320/111; 320/113; 320/115

(58) Field of Classification Search
CPC ............... H02J 7/0027; B60L 2230/00; Y02T 10/7072; Y02T 10/7088
USPC .................................................. 320/107–115
See application file for complete search history.

(56) References Cited

U.S. PATENT DOCUMENTS

| 2004/0135541 A1* | 7/2004 | Cho et al. ...................... 320/107 |
| 2005/0088141 A1* | 4/2005 | Lee et al. ....................... 320/114 |
| 2010/0315041 A1* | 12/2010 | Tan ................................ 320/115 |

* cited by examiner

*Primary Examiner* — Paul Dinh
(74) *Attorney, Agent, or Firm* — Novak Druce Connolly Bove + Quigg LLP

(57) ABSTRACT

A charging dock includes a base, a charging cable and a retractable wire reel module received in the base. A wall of the base is concaved downward to form a charging space including an opening in a cavity of the base. The charging cable includes a power wire, a charging and a power connector interfaces. The charging interface is received in the base. The power interface is positioned out of the base. The retractable wire reel module includes a guiding shaft positioned, a coil spring member and a sleeve member. The sleeve member rotatably sleeves on the guiding shaft via the coil spring member. The power wire is wound on the sleeve member, the coil spring member is connected with the guiding shaft and the sleeve member. The power wire retracts in the base via the sleeve member driven to rotate by the coil spring member.

20 Claims, 5 Drawing Sheets

CHARGING DOCK FOR PORTABLE ELECTRONIC DEVICE

BACKGROUND

1. Technical Field

The present disclosure generally relates to charging docks, and particularly to a charging dock with retractable power wire for charging a portable electronic device.

2. Description of Related Art

Power wires for many charging docks used for charging portable electronic devices, such as mobile phones, are exposed out of the bases of the charging docks. The power wires can be easily damaged by excessive pulling and tearing when unused. Thus, the service life of the charging dock or charging cradle dock stands decreases. In addition, the power wires are also easily tangled.

Therefore, there is room for improvement within the art.

BRIEF DESCRIPTION OF THE DRAWINGS

The components in the drawings are not necessarily drawn to scale, the emphasis being placed upon clearly illustrating the principles of the present disclosure. Moreover, in the drawings, like reference numerals designate corresponding parts throughout several views, and all the views are schematic.

DETAILED DESCRIPTION

Figure 1:
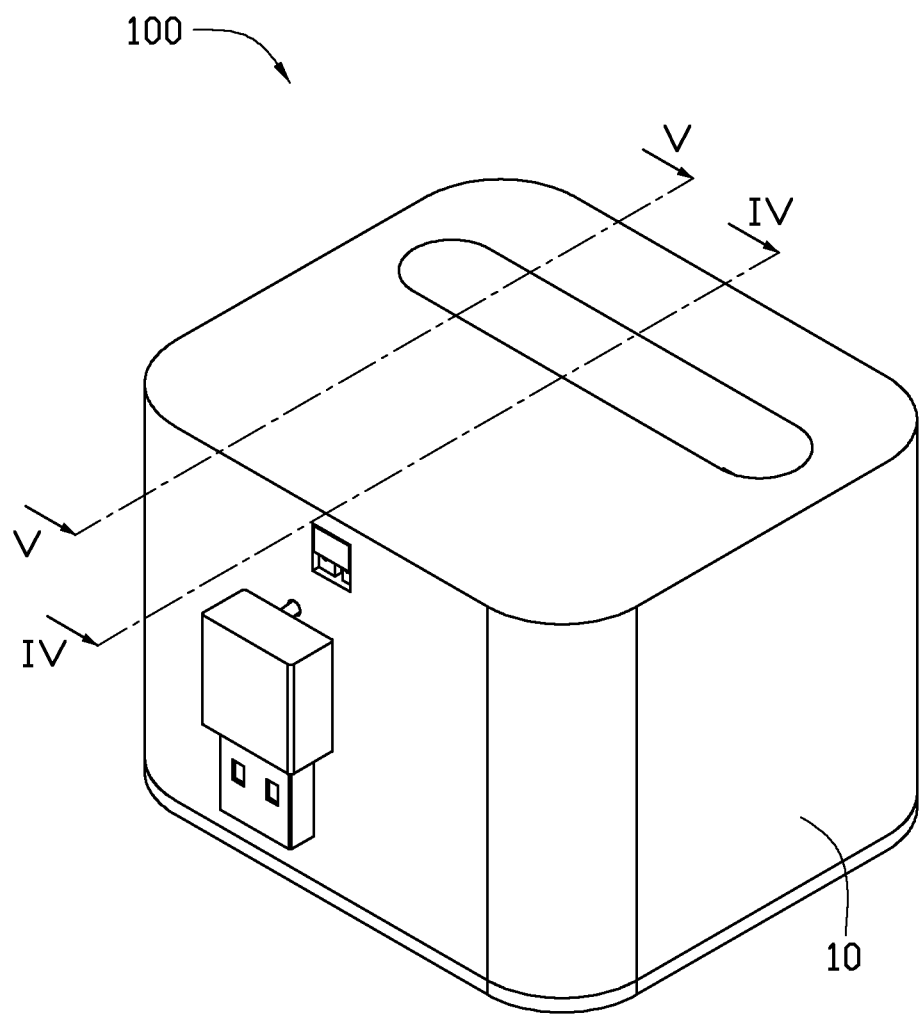
FIG. 1 shows an isometric view of an embodiment of a charging dock.

FIG. 1, is an embodiment of a charging dock 100 used for charging portable electronic devices (not shown) with a charging interface (not shown), and the portable electronic devices are such as for example, mobile phones, or tablet computers.

Figure 2:
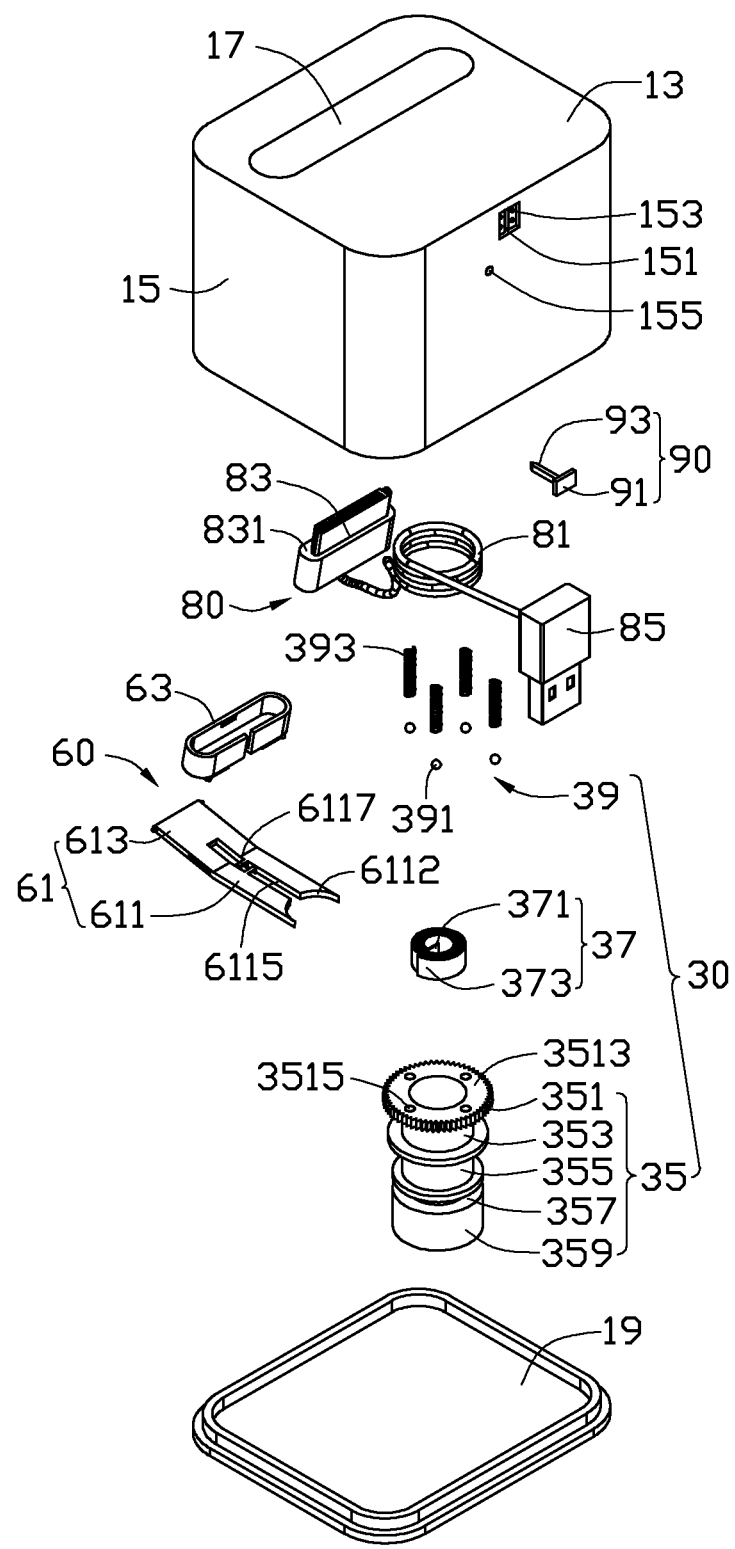
FIG. 2 is an exploded, isometric view of the charging dock of the FIG. 1.
Figure 3:
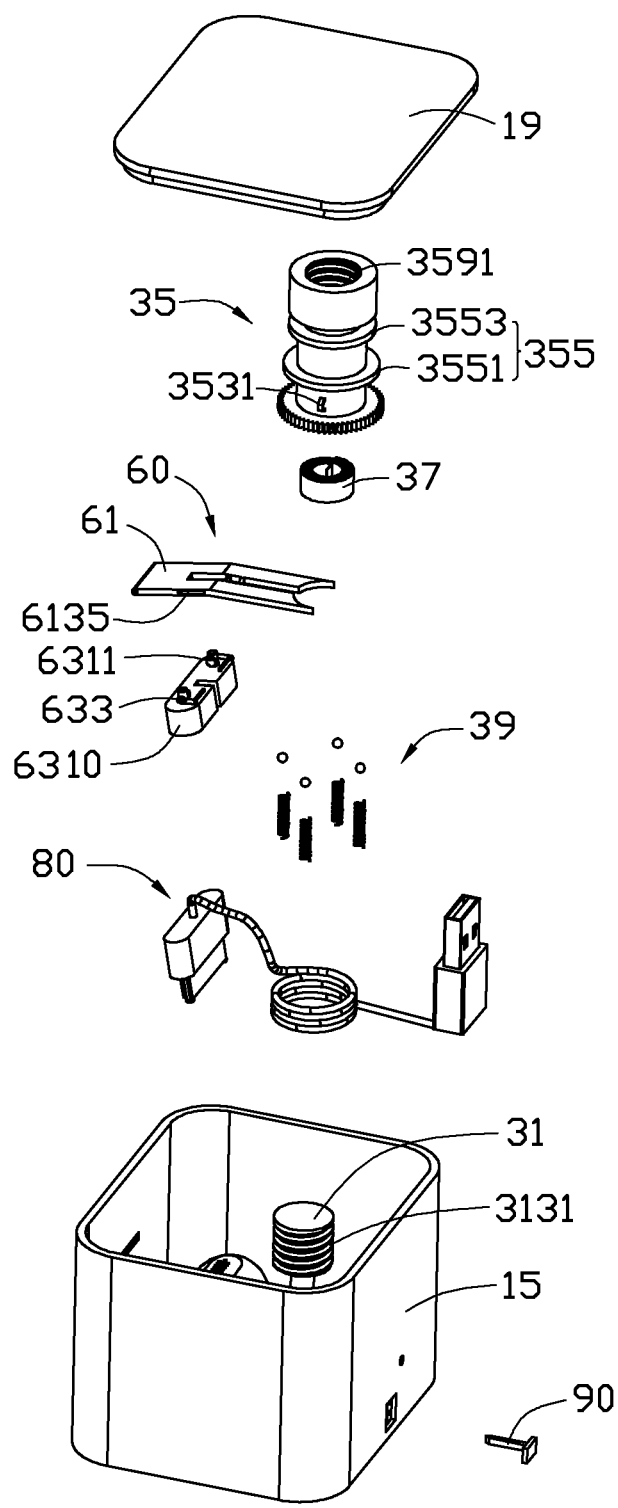
FIG. 3 is similar to FIG. 2, but viewed from another aspect.
Figure 4:
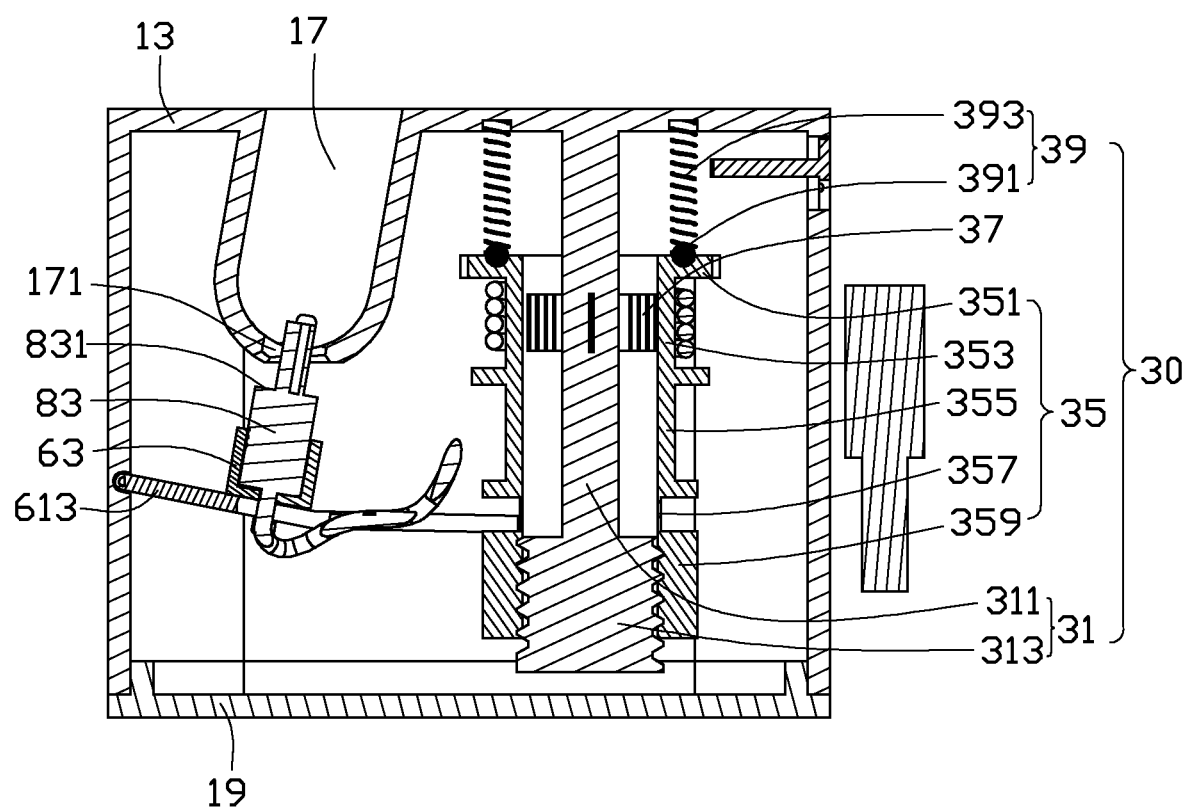
FIG. 4 is a cross-section of the charging dock of FIG. 1, taken along a line labeled as IV-IV.

FIGS. 2 through 4, show the charging dock 100 including a base 10, a retractable wire reel module 30, a pluggable assembly 60, a charging cable 80 and a button 90. An outer surface of the base 10 is concaved downward to form a charging space 17 to receive the portable electronic device. The charging cable 80 includes a power wire 81, a charging connector interface 83 and a power connector interface 85. The charging connector interface 83 and the power connector interface 85 are positioned at the opposite ends of the power wire 81. The power wire 81 is winding on the retractable wire reel module 30. The charging connector interface 83 is received and positioned in the base 10 under the charging space 17. A portion of the charging connector interface 83 can be inserted into the charging space 17. The power connector interface 85 is movably positioned out of the base 10. The pluggable assembly 60 is movably positioned in the base 10, connecting with the power connector interface 85 and the retractable wire reel module 30. The pluggable assembly 60 drives the charging connector interface 83 to move relative to the charging space 17. In other words, the charging connector interface 83 can be driven to electrically connect with the portable electronic device inserted in the charging space 17 for charging, or driven to be detached from the portable electronic device after finished charging of the portable electronic device.

The base 10 is substantially a box, including a top board 13, a side wall 15 and a bottom plate 19 positioned parallel to the top board 13. The charging space 17 is positioned on the top board 13, to be extending from the top board 13. A shape and structure of the charging space 17 is configured to be corresponding to the shape of one end of the portable electronic device with the charging interface. An insertion hole 171 (see FIG. 4) is defined in a bottom of the charging space 17 corresponding to the charging connector interface 83. The side wall 15 extends perpendicularly from the edges of the top board 13 towards a side of the top board 13 positioning the charging space 17. A substantially rectangular sliding groove 151 is formed on the side wall 15 adjacent to an edge of the top board 13 and configured vertical to the top board 13. Four protrusions 153 are formed at the side wall 15 adjacent to two sides of the sliding groove 151. Two of the protrusions 153 are located adjacent to the top board 13. A circular through hole 155 is defined through the side wall 15 under the sliding groove 151. The bottom plate 19 is connected with the side wall 15 away from the top board 13.

The retractable wire reel module 30 includes a guiding shaft 31, a sleeve member 35, and a coil spring member 37. The guiding shaft 31 perpendicularly extends out from an inner surface of the top board 13 between the charging space 17 and the sliding groove 151. The sleeve member 35 rotatably sleeves on the guiding shaft 31, and is screwed at one end of the guiding shaft 31 away from the top board 13. The coil spring member 37 sleeves on the guiding shaft 31 and is received in the sleeve member 35. Two ends of the coil spring member 37 are fastened to the sleeve member 35 and the guiding shaft 31, respectively.

The guiding shaft 31 includes a fastening portion 311 and an outer thread portion 313 with a same axis as that of the fastening portion 311. The fastening portion 311 is fixed to the top board 13. The outer thread portion 313 is connected with an end of the fastening portion 311 away from the top board 13. A diameter of the outer thread portion 313 is greater than that of the fastening portion 311. Several outer threads 3131 are formed on the peripheral surface of the outer thread portion 313. In the illustrated embodiment, the top board 13, the side wall 15 and the guiding shaft 31 are integrally formed. A length of the guiding shaft 31 is less than the height of the side wall 15.

The sleeve member 35 is substantially a hollow cylindrical member, including a gear portion 351, a winding portion 353, a connecting portion 355, a clamping portion 357 and an inner thread portion 359. The gear portion 351, the winding portion 353, the connecting portion 355, the clamping portion 357 and the inner thread portion 359 are coaxial and connected together in that order. The gear portion 351 connects with the winding portion 353. The gear portion 351 includes a resisting surface 3513 away from the winding portion 353, and four receiving holes 3515 separately formed on the resisting surface 3513. A clamping lug 3531 is formed on the outer surface of the winding portion 353 for clamping the power wire 81. A first resisting flange 3551 and a second resisting flange 3553 are formed on opposite ends of the connecting portion 355. The first resisting flange 3551 is located adjacent to the winding portion 353. Several inner threads are formed on the inner wall of the inner thread portion 359 corresponding to the outer threads 3131 of the outer thread portion 313, and threading with the outer thread portion 313. The gear portion 351, the winding portion 353, the connecting portion 355, and the clamping portion 357 sleeve on the fastening portion 311 of the guiding shaft 31, and the inner thread portion 359 is screwed with the outer thread portion 313.

The coil spring member 37 is a torsion spring in the illustrated embodiment. The coil spring member 37 includes an inner end section 371 and an outer end section 373. The inner end section 371 is connected with the fastening portion 311. The outer end section 373 is connected with the inner wall of the winding portion 353. The coil spring member 37 may be a wound-up spring in an alternative embodiment.

The retractable wire reel module 30 further includes a resisting assembly 39 resisting between the top board 13 and the resisting surface 3513 of the gear portion 351.

The resisting assembly 39 includes four ball bearings 391 and four elastic elements 393. Each ball bearing 391 is partly clamped in each receiving hole 3515 for guiding each elastic element 393. The portion of the ball bearing 391 exposing out of the receiving hole 3515 is received within one end of the elastic element 393. Each elastic element 393 is compressed between the top board 13 and the resisting surface 3513. In an alternative embodiment, the ball bearings 391 can be omitted; the number of the elastic elements 393 is at least one.

The pluggable assembly 60 includes a pluggable member 61 and a holder 63 slidably positioned on the pluggable member 61. The pluggable member 61 is a substantially bent board, including a clipping portion 611 and a support portion 613 extending from one end of the clipping portion 611. The support portion 613 is obliquely configured relative to the clipping portion 611 toward the charging space 17. The clipping portion 611 is substantially parallel to the bottom plate 19. The pluggable member 61 includes a clamping end 6112 defined at a distal end of the clipping portion 611 for clamping the clamping portion 357. The pluggable member 61 moves along the guiding shaft 31 and the sleeve member 35 rotates relative to the pluggable member 61. A wiring groove 6115 is formed in the pluggable member 61 extending from the clamping end 6112 to a middle of the support portion 613. Two parallel spacing posts 6117 are respectively formed on opposite sidewalls of the wiring groove 6115 and adjacent to the support portion 613. The spacing posts 6117 restrict the power wire 81. Two guiding grooves 6135 are respectively defined on the opposite side surfaces of the support portion 613 connecting with the clipping portion 611.

The holder 63 includes a main body 631 and two guiding posts 633. The main body 631 is a hollow base including an opening 6310 positioned on a side of the support portion 613 facing the top board 13. The main body 631 is disposed under the charging space 17 for receiving the charging connector interface 83. Two connecting blocks 6311 are formed on an end surface of the main body 631 opposite to the opening 6310 corresponding to the two guiding grooves 6135. Each guiding post 633 is substantially L-shaped. Each guiding post 633 is pivoted with one connecting block 6311 at one end thereof, and another end of the guiding post 633 is slidably positioned in the corresponding guiding groove 6135.

The charging cable 80 is received in the base 10. The power wire 81 winds on the winding portion 353 of the retractable wire reel module 30. The power wire 81 passes through the wiring groove 6115 to connect with the charging connector interface 83 at one end thereof, and passes through the through hole 155 to connect with the power interface 85 at another end of the power wire 81 away from the charging connector interface 83. A length of the part of the power wire 81 that is extending from the charging connector interface 83 to the winding portion 353 is greater than that of the part of the power wire 81 that is extending from the winding portion 353 to the power connector interface 85. As a result, a length of the power wire 81 is sufficient enough to fully pull out or retract.

The charging connector interface 83 is partially received in the main body 631 under the charging space 17, and extends in the charging space 17 via the insertion hole 171 to connect with the portable electronic device. A second resisting surface 831 is formed on the charging connector interface 83 facing the charging space 17. The power connector interface 85 is movably positioned out of the base 10. A vertical distance between the second resisting surface 831 and a bottom of the charging space 17 is less than a vertical height between the protrusion 153 adjacent to the top board 13 and the gear portion 351.

The button 90 stops the movement of the sleeve member 35 relative to the guiding shaft 31. The button 90 includes a sliding portion 91 and a resisting portion 93 formed perpendicularly on the sliding portion 91. The sliding portion 91 is slidably positioned abutting the sliding groove 151 and engaged with the protrusions 153 adjacent to the top board 13. The resisting portion 93 extends into the base 10. The resisting portion 93 is able to resist the gear portion 351 when the sliding portion 91 is engaged with the protrusions 153 away from the top board 13.

Figure 5:
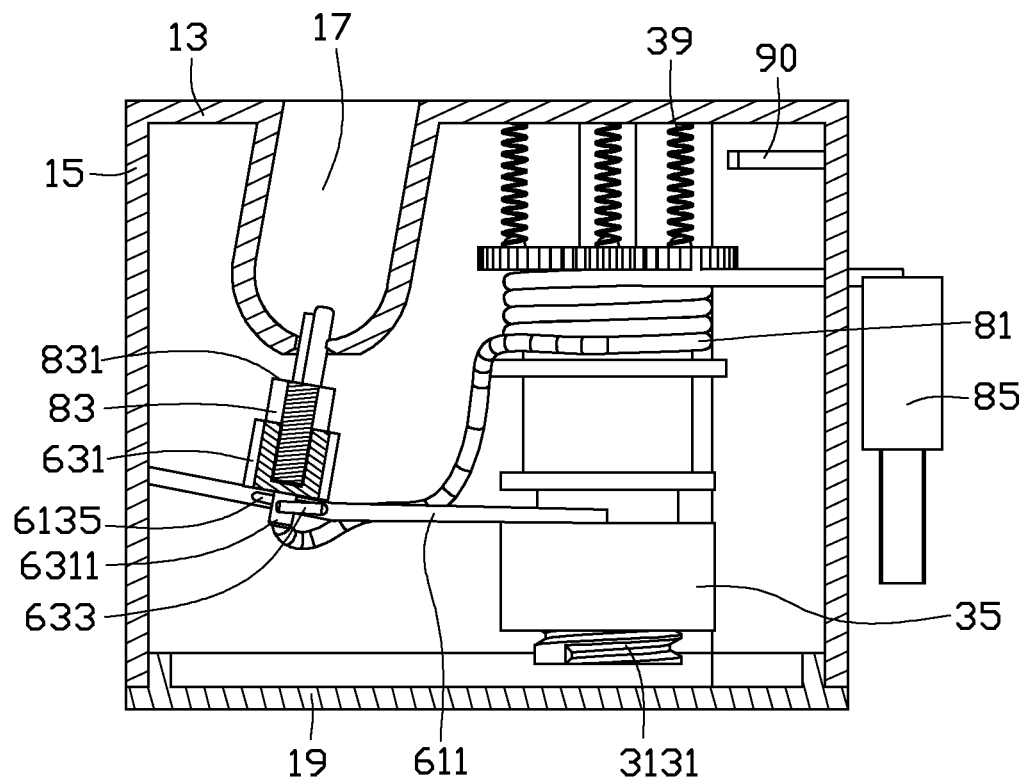
FIG. 5 is a cross-section of the charging dock of FIG. 1, taken along a line labeled as V-V.

FIG. 5 shows in assembly, the resisting assembly 39 is positioned on the sleeve member 35. The coil spring member 37 and the sleeve member 35 are sleeved on the guiding shaft 31. The inner thread portion 359 is threadedly engaged with the outer thread portion 313. The coil spring member 37 is connected with the fastening portion 311 and the inner wall of the winding portion 353. Each elastic element 393 is fastened to the top board 13. The pluggable assembly 60 is assembled with the sleeve member 35. The charging connector interface 83 is connected with the power wire 81, and partially received within the holder 63, and extends into the charging space 17. The power wire 81 passes through the pluggable assembly 60, winds around on the winding portion 353, passes through the through hole 155, and finally connects with the power connector interface 85 out of the base 10. The button 90 is slidably positioned in the sliding groove 151. The guiding posts 633 resist an end of the guiding grooves 6135 adjacent to the clipping portion 611. The bottom plate 19 is connected with the edge surfaces of the side wall 15 away from the top board 13 to enclose to form the base 10.

When the charging dock 100 is in use, the end of the portable electronic device with the charging interface thereof is inserted in the charging space 17. The power connector interface 85 is pulled outward to conductively connect with the power supply (not shown). The sleeve member 35 is driven to rotate by the power wire 81 relative to the guiding shaft 31 and move towards the top board 13 along the guiding shaft 31. The elastic elements 393 are compressed. The coil spring member 37 stores energy because of shape distortion thereof. The pluggable assembly 60 is driven to move towards the charging space 17. The second resisting surface 831 resists against the bottom of the charging space 17 when the reserved length of the power wire 81 is pulled out. Then, the charging connector interface 83 is electrically connected with the portable electronic device for charging. The button 90 is pulled and engages with the protrusion 153 away from the top board 13, thereby allowing the resisting portion 93 to engage with the gear portion 351. The guiding posts 633 resist an end of the guiding groove 6135 away from the clipping portion 611 because of their weight.

The power connector interface 85 is extracted or detached from the power supply when the charging session is finished. The resisting portion 93 is pushed towards the top board 13 and clamped with the protrusion 153 adjacent to the top board 13. Then, the sliding portion 91 leaves the gear portion 351. The elastic elements 393 and the coil spring member 37 drive the sleeve member 35 to rotate and move towards the bottom plate 19. The power wire is driven to retract and winds around on the winding portion 353. The pluggable assembly 60 is driven to move towards the bottom plate 19 by the sleeve member 35. The pluggable assembly 60 extracts or detaches the charging interface of the portable electronic device from the charging connector interface 83.

The sleeve member 35 rotatably sleeves on the guiding shaft 31 via the coil spring member 37. The power wire 81 automatically retracts because of the rotation of the sleeve member 35. That is, it is convenient to use and carry. The sleeve member 35 also screws with the guiding shaft 31. The pluggable assembly 60 is driven to facilitate or withdraw from connecting to the portable electronic device 100 by the sleeve member 35. In addition, the button 90 engages with the gear portion 351 to stop the movement of the sleeve member 35. As a result, the power wire 81 is prevented from being damaged. Furthermore, the support portion 613 is obliquely configured relative to the clipping portion 611 because the displacement of the support portion 613 is shorter than that of the clamping end 6112 during the charging session. Therefore, the charging connector interface 83 is not easy to deviate from the portable electronic device because the guiding posts 633 resist the end of the guiding groove 6135 away from the clipping portion 611.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A charging dock, comprising:
    a base forming a charging space;
    a charging cable comprising a power wire, a charging connector interface, and a power connecting interface, the charging connector interface connected with one end of the power wire, the power connecting interface received in the base, the power connecting interface connected with another end of the power wire, and the power connecting interface movably positioned out of the base; and
    a retractable wire reel module comprising: a guiding shaft positioned in the base adjacent to the charging space, a coil spring member, and a sleeve member rotatably sleeved on the guiding shaft via the coil spring member in the base,
    wherein the power wire is winding around on the sleeve member, the coil spring member is connected with the guiding shaft at one end and connected with the sleeve member at another end of the coil spring member, the power wire is configured to be withdrawn to wind around on the sleeve member depending on the sleeve member driven to rotate by the coil spring member.

2. The charging dock of claim 1, wherein the charging dock further comprises a pluggable member in the base; one end of the pluggable member is rotatably assembled with the sleeve member, and the pluggable member is able to be driven to move along the guiding shaft together with the sleeve member rotating relative to the pluggable member; and the charging connector interface of the charging cable is positioned on the pluggable member.

3. The charging dock of claim 2, wherein the guiding shaft comprises an outer thread portion; the sleeve member comprises a winding portion, a connecting portion, and an inner thread portion connected with the connecting portion; the outer thread portion is threadedly engaged with the inner thread portion; the power wire is winding around on the winding portion; the coil spring member is connected with the guiding shaft at one end, and connected with the inner wall of the winding portion at another end of the coil spring.

4. The charging dock of claim 3, wherein the base comprises a top board and a side wall extending from the edges of the top board; a portion of the top board is concaved downward to form the charging space.

5. The charging dock of claim 4, wherein the retractable wire reel module further comprises at least one elastic element compressed between an inner surface of the top board and the sleeve member.

6. The charging dock of claim 5, wherein the retractable wire reel module further comprises at least one ball bearing corresponding to the at least one elastic element; at least one receiving hole is defined on an end surface of the sleeve member facing the top board, each ball bearing is partly clamped in each receiving hole; each elastic element is compressed between the top board and the end surface of the sleeve member facing the top board; and a part of each ball bearing exposed out of the receiving hole is received within one end of the elastic element.

7. The charging dock of claim 3, wherein a sliding groove is formed on the base, the guiding shaft is between the charging space and the sliding groove; at least one protrusion is formed on the base adjacent to at least one side of the sliding groove.

8. The charging dock of claim 7, wherein the charging dock further comprise a button; the button comprise a sliding portion and a resisting portion formed on the sliding portion; the sliding portion is slidably positioned in the sliding groove; the resisting portion extends into the base via the sliding groove; the sleeve member further comprises a gear portion connecting with the winding portion away from the inner thread portion; the resisting portion of the button is configured to resist the gear portion for stopping the movement of the sleeve member.

9. The charging dock of claim 3, wherein a clamping lug is formed on the outer surface of the winding portion for clamping the power wire.

10. The charging dock of claim 3, wherein the guiding shaft further comprises a fastening portion connecting with the outer thread portion; the fastening portion is connected with the base at one end away from the outer thread portion; a diameter of the outer thread portion is greater than a diameter of the fastening portion; the coil spring member is connected with the fastening portion at an end of the coil spring member away from the winding portion.

11. The charging dock of claim 3, wherein the pluggable member comprises a clipping portion and a support portion extending from one end of the clipping portion, the sleeve member is rotatably assembled with the clipping portion, the clipping portion is clamping the sleeve member; the charging connector interface is positioned on the support portion.

12. The charging dock of claim 11, wherein a clamping end is defined at a distal end of the clipping portion away from the support portion for engaging and clamping the sleeve member.

13. The charging dock of claim 12, wherein a wiring groove is formed in the pluggable member extending from the clamping end to the support portion, the power wire passes through the wiring groove.

14. The charging dock of claim 13, wherein at least one spacing post is formed on the sidewalls of the wiring groove.

15. The charging dock of claim 2, wherein the charging dock further comprises a holder slidably assembled with the pluggable member; the charging connector interface is partly received in the holder and configured for being driven to move in the charging space by the sleeve member.

16. The charging dock of claim 12, wherein at least one guiding groove is axially formed on two side surfaces of the pluggable member; the holder comprises a main body and at least one guiding post; the charging connecting end is partly received in the main body, each guiding post is pivoted with the main body at one end and slidably positioned in corresponding guiding groove with another end.

17. A charging dock, comprising:
   a base forming a charging space;
   a charging cable comprising a power wire, a charging connector interface, and a power connecting interface, the charging connector interface connected with one end of the power wire, the power connecting interface received in the base, the power connector interface connected with another end of the power wire, and the power connecting interface movably positioned out of the base; and
   a retractable wire reel module comprising: a guiding shaft positioned in the base adjacent to the charging space, a coil spring member, and a sleeve member rotatably sleeved on the guiding shaft via the coil spring member in the base,
   a pluggable member rotatably assembled with the sleeve member,
   wherein the power wire is winding around on the sleeve member, the coil spring member is connected with the guiding shaft at one end of the coil spring member and connected with the sleeve member at another end of the coil spring member, the power wire is configured to be withdrawn to wind around on the sleeve member depending on the sleeve member driven to rotate by the coil spring member, the pluggable member is configured to move along the guiding shaft together with the sleeve member.

18. The charging dock of claim 17, wherein the guiding shaft comprises an outer thread portion; the sleeve member comprises a winding portion and an inner thread portion connected with the winding portion; the outer thread portion of the guiding shaft is screwed with the inner thread portion of the sleeve member; the power wire is winding around on the winding portion; the coil spring member is connected with the guiding shaft at one end of the coil spring and connected with the inner wall of the winding portion at another end of the coil spring.

19. The charging dock of claim 18, wherein the base comprise a top board and a side wall extending from edges of the top board; a charging space is positioned and concaved downward on the top board, the retractable wire reel module further comprises a resisting assembly which is resisting between the top board and the sleeve member.

20. The charging dock of claim 19, wherein the resisting assembly comprises at least one elastic element compressed between the between the top board and the sleeve member.

\* \* \* \* \*